US008631975B2

(12) United States Patent
Lim

(10) Patent No.: US 8,631,975 B2
(45) Date of Patent: Jan. 21, 2014

(54) AIRLESS PUMP AND COSMETIC CONTAINER HAVING THE SAME

(75) Inventor: Jun-Kuk Lim, Gyeonggi-do (KR)

(73) Assignee: Toly Korea, Inc., Gyeonggi-Do (KR)

( * ) Notice: Subject to any disclaimer, the term of this patent is extended or adjusted under 35 U.S.C. 154(b) by 197 days.

(21) Appl. No.: 13/267,060

(22) Filed: Oct. 6, 2011

(65) Prior Publication Data

US 2012/0267398 A1 Oct. 25, 2012

(30) Foreign Application Priority Data

Apr. 25, 2011 (KR) ........................ 10-2011-0038291
Jun. 15, 2011 (KR) ........................ 10-2011-0057998

(51) Int. Cl.
*G01F 11/02* (2006.01)

(52) U.S. Cl.
USPC ......................... 222/256; 222/387; 222/321.8

(58) Field of Classification Search
USPC ................... 222/256, 173, 321.7–321.8, 386, 222/402.13, 402.15, 386.5, 162, 260, 340, 222/380, 387; 239/331, 333
See application file for complete search history.

(56) References Cited

U.S. PATENT DOCUMENTS

| | | | | | |
|---|---|---|---|---|---|
| 4,138,039 | A * | 2/1979 | Micallef | ........................ | 222/207 |
| 4,185,776 | A * | 1/1980 | Nozawa | ........................ | 239/333 |
| 4,264,037 | A * | 4/1981 | Nozawa | ........................ | 239/333 |
| 5,052,592 | A * | 10/1991 | Wilken et al. | ................. | 222/212 |
| 5,310,092 | A * | 5/1994 | Targell | .......................... | 222/167 |
| 6,419,124 | B1 * | 7/2002 | Hennemann et al. | ...... | 222/321.6 |
| 6,543,653 | B2 * | 4/2003 | Lamboux | ................... | 222/321.8 |
| 6,983,865 | B2 * | 1/2006 | Cabarroque et al. | ..... | 222/153.13 |
| 7,431,181 | B2 * | 10/2008 | Masuda | ........................ | 222/256 |
| 2002/0008122 | A1 * | 1/2002 | Ritsche et al. | ............. | 222/383.3 |
| 2004/0056049 | A1 * | 3/2004 | Stradella | .................... | 222/321.7 |

* cited by examiner

*Primary Examiner* — Kevin P Shaver
*Assistant Examiner* — Robert Nichols, II
(74) *Attorney, Agent, or Firm* — Levine & Mandelbaum

(57) ABSTRACT

An airless pump and a cosmetic container including the same. The airless pump includes a nozzle of a head and a compression cylinder disposed between the storage container and the nozzle. A sealing cap fixes the compression cylinder. A piston valve and a piston are fastened into an inner compression chamber inside the compression cylinder. An operation pipe is disposed above the sealing cap in a direction perpendicular to the direction in which an operation button is pushed. The operation pipe is actuated and drives the piston and piston valve in the perpendicular direction. A spring is disposed between the operation pipe and the sealing cap. A slider axially is axially coupled to the operation pipe in the perpendicular direction. The slider is actuated by the operation button to horizontally reciprocate in a direction, thereby driving the operation pipe in the perpendicular direction.

7 Claims, 15 Drawing Sheets

AIRLESS PUMP AND COSMETIC CONTAINER HAVING THE SAME

BACKGROUND OF THE INVENTION

1. Field of the Invention

The present invention relates, in general, to an airless pump and a cosmetic container including the same. More particularly, the present invention relates to an airless pump and a cosmetic container including the same, in which the structure of the airless pump is improved so as to increase operability and facilitate use, a nozzle is actuated to open or close concurrently with the operation of the pump in order to block external impurities and air from entering when the container is not being used, so that the content may be safely protected, and the nozzle is opened concurrently with the operation of the pump when the container is used, so as to dispense a predetermined amount of the content.

2. Description of the Related Art

Cosmetics made of, for example, gel or cream, are typically used by being contained in dedicated cream cosmetic containers that have relatively wide openings, which are opened/closed by caps, or in tubular cosmetic containers.

Cosmetic cream containers are made of glass or synthetic resin, and are configured such that a user may use cosmetic cream by scooping it out with a finger. Consequently, most such containers have openings that are relatively wide and short.

Accordingly, the user removes a suitable amount of cosmetic cream from inside a container by opening the cap and scooping the cosmetic cream with a finger, and stores the cosmetic cream by closing the container with the cap after having used the cosmetic cream.

However, such a traditional cosmetic cream container does not provide more than the function of simply containing and keeping cosmetic cream therein, and has a structural problem in that it is difficult to create a hermetic seal for the opening when storing the cosmetic cream, since the container is configured such that it is opened/closed using the cap.

There is another problem in that air, impurities, or the like may easily enter the container whenever the content is used, since the container is opened using the cap, thereby polluting or deteriorating the cosmetic cream.

In particular, even if the cosmetic cream is not rapidly polluted or deteriorated, the cosmetic cream easily loses its characteristic perfume or moisture whenever the cap is opened, thereby losing its essential components.

In addition, there are problems in that the cosmetic is wasted, since it is difficult to use the cosmetic cream by removing the required amount with the finger as desired by the user, and that the finger increases the pollution and deterioration of the cosmetic cream through this process.

Furthermore, the cosmetic container has a simple structure with a wide opening, since the cosmetic is used with the finger. However, it is difficult to use all of the cosmetics, since a portion of the cosmetics is left on the edges of the bottom.

Another type of cosmetic cream containers in the related art is tubular cosmetic containers.

Tubular containers are made of one selected from among a variety of soft materials, such as aluminum, laminate, and synthetic resin, and are configured such that the content is dispensed out through a relatively narrow orifice when pressure is applied against the surface thereof. Tubular containers are widely used in order to contain not only cosmetics but also a variety of medical supplies having the form of cream, toothpaste, and detergents such as shampoo.

Although such tubular cosmetic containers have advantages in that they can efficiently keep the content and are convenient to use, their external shape must be disadvantageously deformed since the entire volume is reduced in proportion to the amount of content that has been dispensed, attributable to the intrinsic characteristics of the tube.

Specifically, there is a structural problem in that, as the external shape of the tube is gradually crushed in response to the amount of the content that has been used, it becomes impossible for the tube to keep the original external shape, and thus its appearance worsens. Furthermore, due to the deformed external shape, the preservation ability is lowered and it is not easy to handle the tube when using the tube.

In addition to the foregoing problems, the structure in which the opening is opened and closed causes a structural problem in that external air inevitably enters when the tube is being used. Furthermore, due to the structure in which the content is dispensed by compressing the tube, it is difficult to dispense a suitable amount of the content when using the content.

Recently, in order to solve the problems described above, a cosmetic container having a dual structure that includes tubular inner and outer shells, with an airless pump mounted on an opening, was developed. This structure was also proposed by the applicant.

An example is a patent that was previously proposed by the applicant, Korean Patent Application No. 10-2008-49071 (Korean Patent No. 10-0963155). This patent discloses a dual structure in which a tubular inner shell is disposed inside a rigid outer shell, and an airless pump is mounted on openings of the inner and outer shells.

Consequently, when an operation button of the pump, which is exposed to the outside from the external shell, is pushed, the pumping force of the pump dispenses the cosmetic that is contained in the tubular inner shell through a nozzle, so that a user may conveniently use the cosmetics.

In the foregoing patent, which was previously registered, both external air and impurities are prevented from entering when the container is not being used, whereas the content is dispensed in a predetermined amount following the operation of the pump when the container is being used. Thus, the original function is satisfactorily realized. However, there is an inconvenience in the use thereof, since the operation button is disposed on the upper portion and the container is operated by upward and downward pushing. Thus, there are several structural problems. For example, the nozzle is disposed on the side portion, and thus the content leaks to the outside when it is dispensed through the side portion.

The configuration of a cosmetic container mounted with another form of airless pump is disclosed in Korean Patent Application No. 2009-27218. Here, the pump is disposed in the upper portion of a storage container without a tube, in which the pump is operated when a operation button is pushed so that content is dispensed upwards.

However, this approach of the related art has a problem in that the content sticks to a finger when pushing the operation button, since the operation button is disposed parallel to a nozzle in the upper surface of the container.

In addition most examples of the airless pump of the cosmetic container that was proposed in the related art are configured such that a cylinder is disposed between the storage container and the nozzle, a piston is elastically disposed in the cylinder via a spring, and an operation button, which is exposed to the outside, is fastened to one side portion of the piston. Consequently, there is a problem in that errors frequently occur, since a perfect hermetic seal is not provided.

Specifically, there is the problem of pressure leak, since the process of transmitting power that is produced when pushing the operation button is implemented by reciprocating the piston inside the cylinder. In addition, there is a problem in that the performance of dispensing the content is significantly decreased, since the passage of dispensing the content is long.

Furthermore, even the cosmetic container that has the airless pump as described above has a structural problem in that part of the content that is not dispensed always remains along the dispensing passage between the nozzle and the airless pump. The remainder is then exposed to ambient air, thereby being polluted and deteriorated.

SUMMARY OF THE INVENTION

Accordingly, the present invention has been made keeping in mind the above problems occurring in the related art, and the present invention is intended to provide an airless pump by improving the structure of the airless pump, in which the power of an operation button that is produced when the operation button is pushed is converted in the direction perpendicular to the direction in which the operation button is pushed, so that pumping can be realized in the upward and downward directions, thereby improving the operability and reliance of the airless pump.

The present invention is also intended to provide an airless pump, in which the operation button of the pump is provided in the side portion of the container such that it can be pushed from outside, and the nozzle is opened and closed concurrently with the operation of the pump in order to fundamentally block ambient air from entering, thereby preventing gel and cream type cosmetics from being polluted or deteriorated.

The present invention is also intended to provide a cosmetic container to which an airless pump is applied, in which the airless pump dispenses a correct amount of content, so that expensive cosmetic can be conveniently used without being wasted, and content can be dispensed to the outside through a concave usage recess, so that it can be conveniently used by being scooped with a finger.

The present invention for realizing the foregoing objects is implemented by improving the structure of the airless pump, which is disposed inside the cosmetic container. The airless pump of the present invention is disposed inside the head of the container in the direction perpendicular to the direction in which the operation button is pushed, and the operation button of the pump is disposed in the side portion of the head, so that the button can be pushed in the direction in which the operation button is pushed in the transverse direction of the container.

In addition, the nozzle-opening/closing means is disposed inside the nozzle, which is disposed on the upper portion of the head, such that the nozzle-opening/closing means is movable up and down in the direction perpendicular to the direction in which the operation button is pushed, so that the nozzle can be opened and closed concurrently with the pumping operation of the pump.

In addition, the process of transmitting the power of the operation button that is produced through the operation of the airless pump is implemented by transmitting the power from the direction in which the operation button is pushed to the perpendicular direction. Consequently, efficient pumping operation can be expected, and the passage of dispensing the content is decreased to the shortest length, thereby improving the accuracy and reliability of the dispensing operation.

Since the airless pump as described above is applied to the cosmetic container according to the present invention, expensive cosmetic can be conveniently and safely used without being wasted, polluted, or deteriorated. Furthermore, the content can be easily used by dispensing it to the upper usage recess of the cosmetic container so that it can be scooped by a finger.

In the present invention, the airless pump is disposed inside the cosmetic container, the operation button is disposed in the side portion of the pump, and the nozzle is oriented upwards in the longitudinal direction of the cosmetic container, so that the user can operate the airless pump with one hand. This consequently provides advantages in that the operation is easy and the content that is dispensed can be conveniently used.

Specifically, since a predetermined amount of content is accurately dispensed to the upper usage recess of the cosmetic container in response to the operation of the pump that is pushed at the side portion thereof, the user can conveniently use the content by scooping it with one finger.

In addition, since the process of transmitting the power of the operation button is implemented by transmitting the power from the direction in which the operation button is pushed to the perpendicular direction, the operability of the pump is improved and the dispensing passage is decreases, thereby significantly decreasing function frequencies and proportionally increasing dispensing efficiency.

Furthermore, since the nozzle-opening/closing means is disposed inside the nozzle such that it operates concurrently with the operation of the pump, it is possible to fundamentally blocking external air and impurities from entering when the cosmetic container is not used so that the content can be safely stored for a long time.

In particular, since the airless pump described above is applied to the cosmetic container according to the present invention, there is an advantage in that expensive gel and liquid cosmetics can be safely and conveniently used for a long time without being wasted, polluted, or deteriorated.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
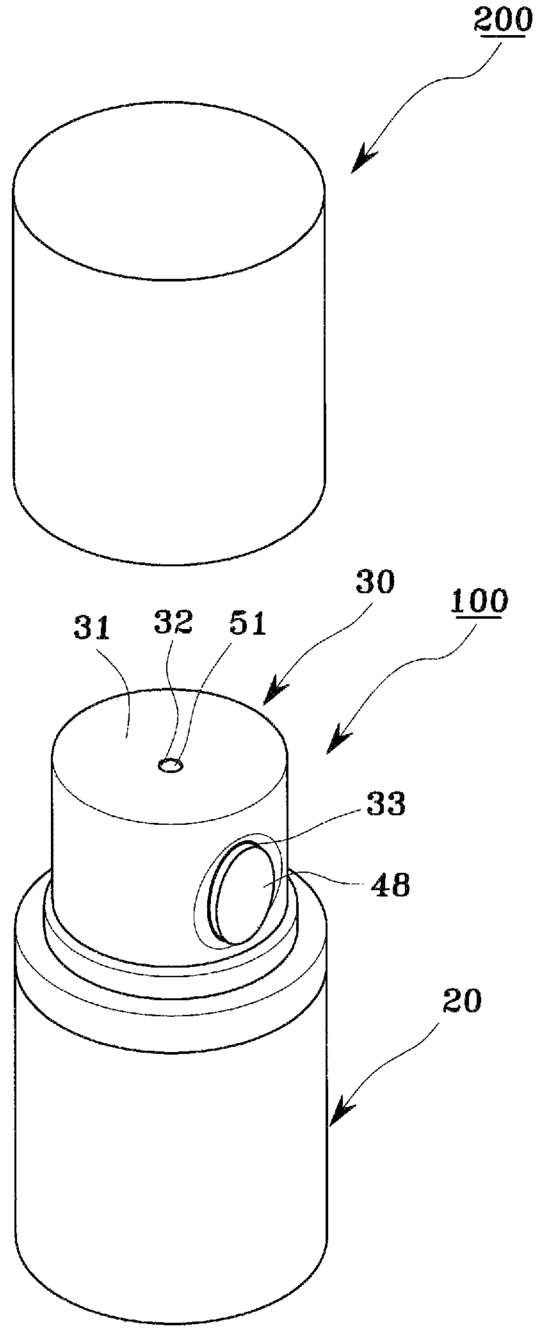
FIG. 1 a perspective view showing the overall external shape of a cosmetic container according to the present invention.
Figure 2:
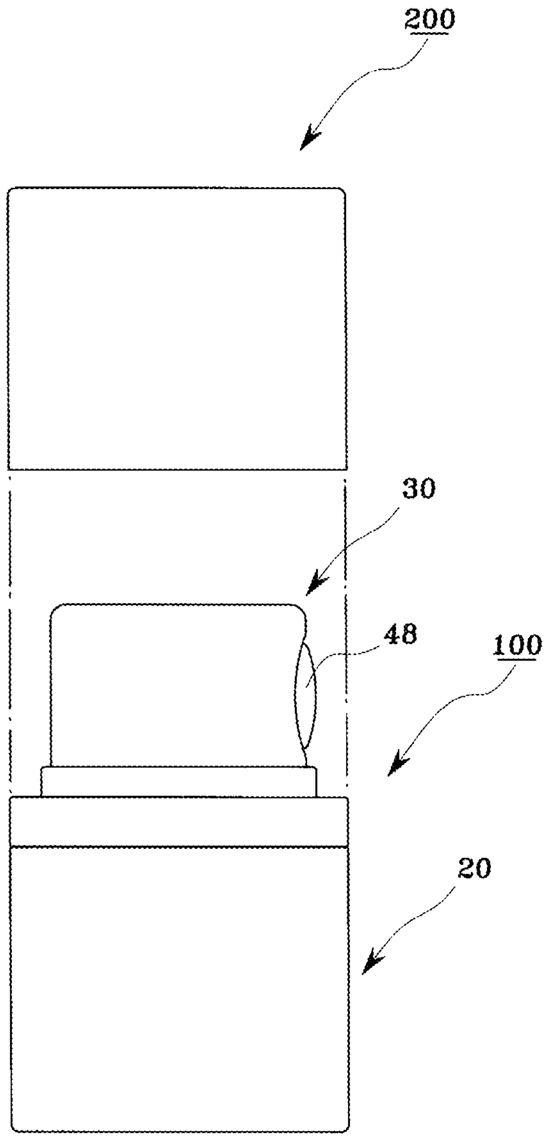
FIG. 2 is a front elevation view of the cosmetic container according to the present invention shown in FIG. 1.
Figure 3:
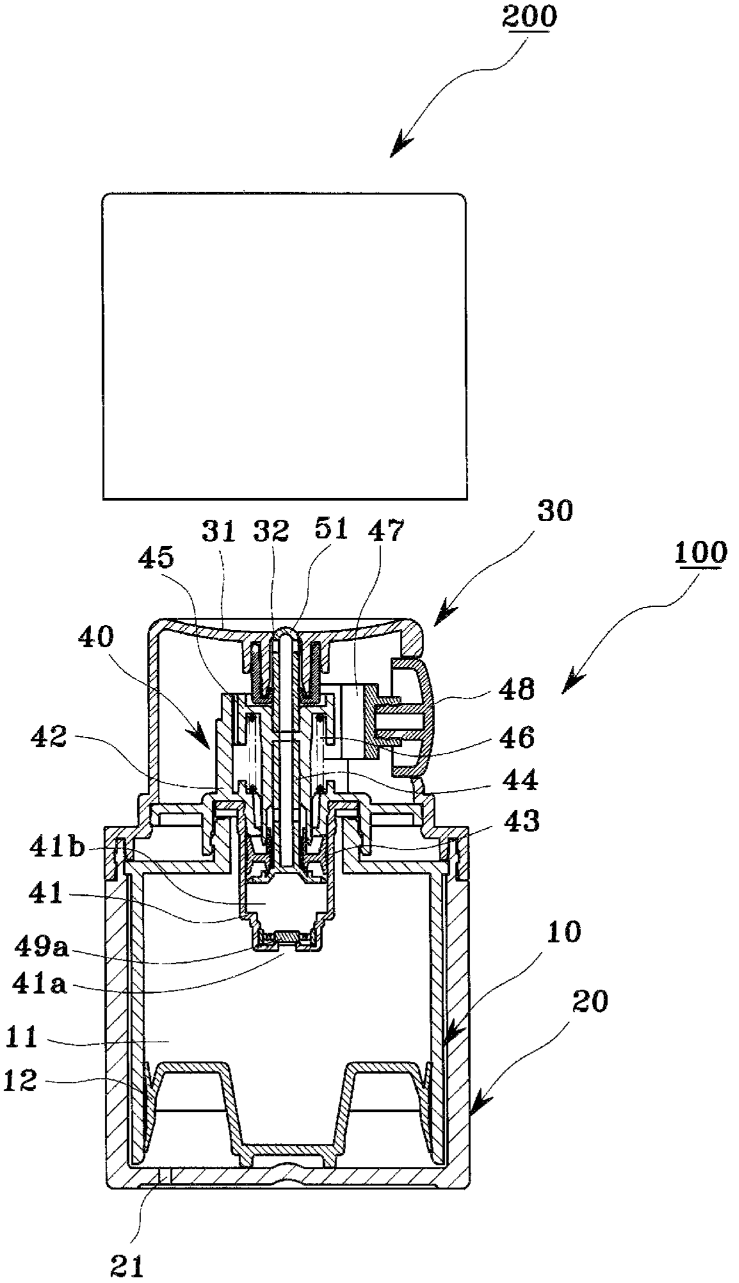
FIG. 3 is a cross-sectional view of the container of the cosmetic container according to the present invention shown in FIG. 1.
Figure 4:
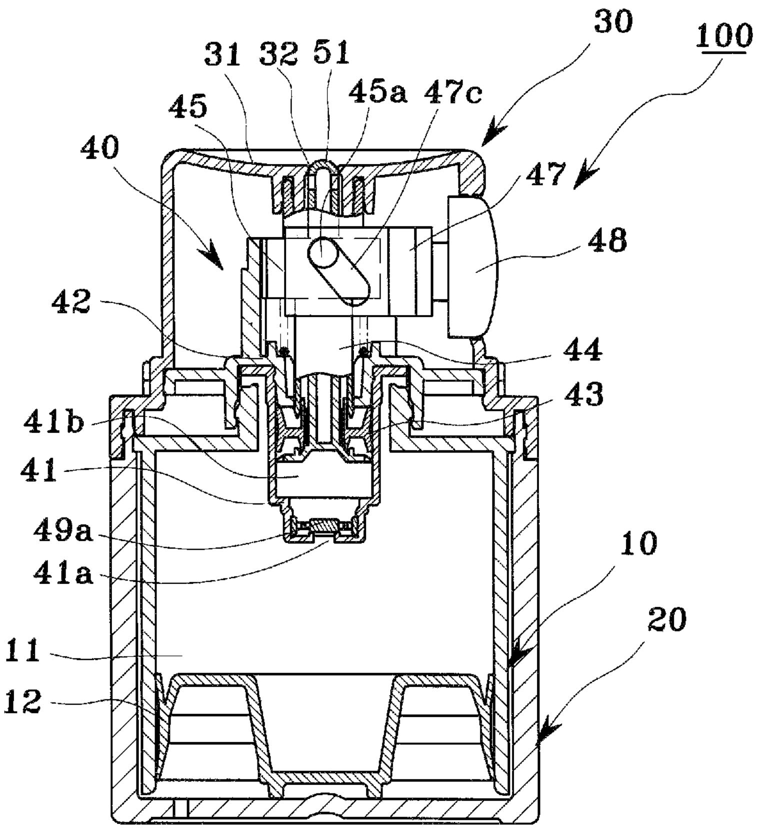
FIG. 4 is a cross-sectional view showing the internal configuration of a part of the container according to the present invention shown in FIG. 3.
Figure 5:
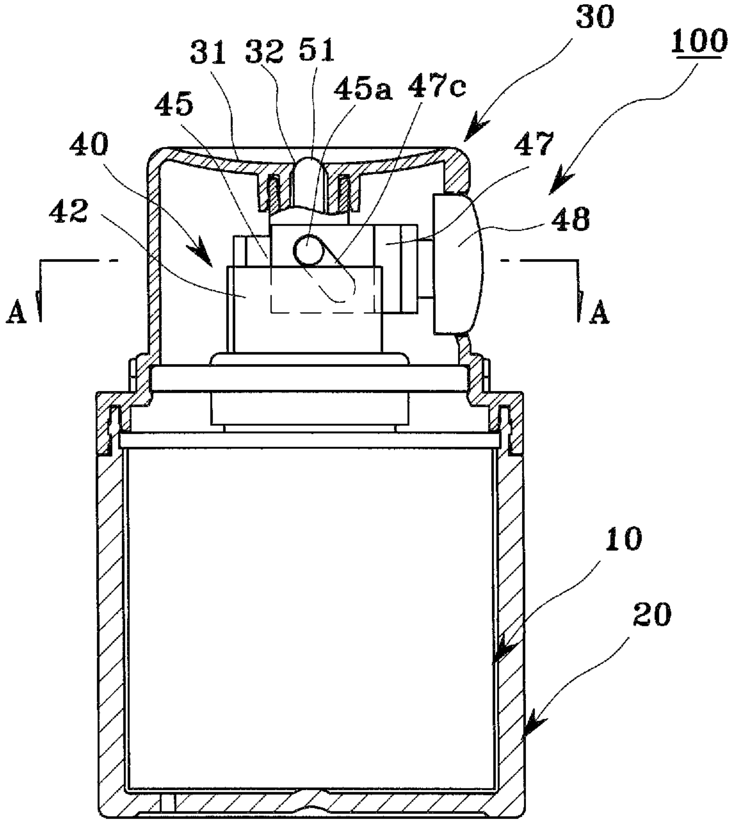
FIG. 5 is a partial cutaway view showing the configuration of the container according to the present invention.
Figure 6:
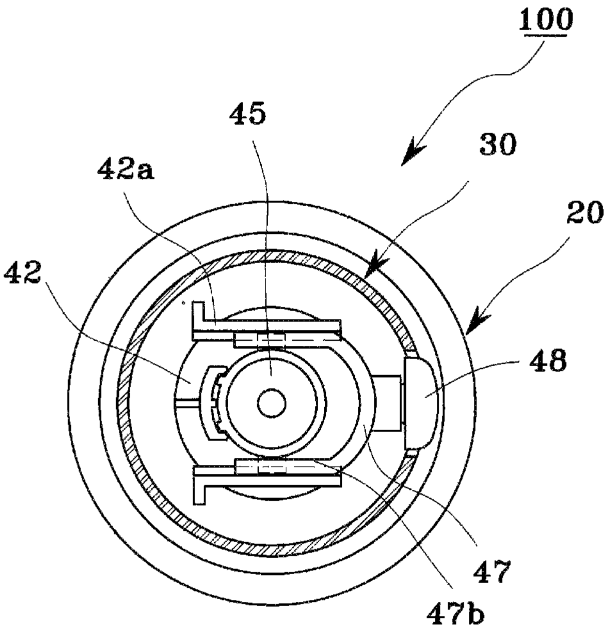
FIG. 6 is a cross-sectional view showing the container according to the present invention taken along line A-A.
Figure 7:
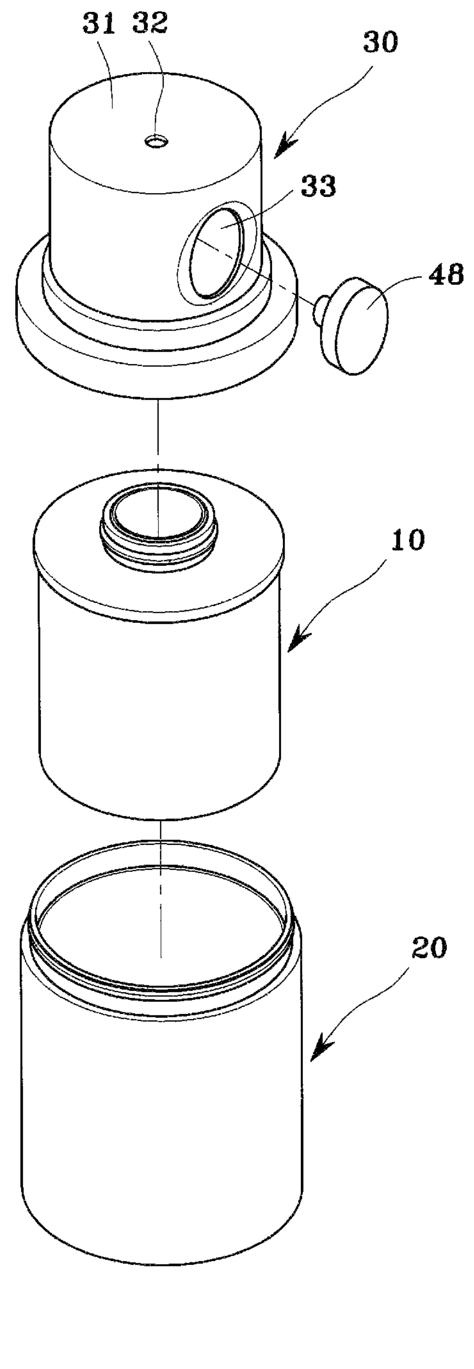
FIG. 7 is an exploded perspective view showing the external shape of the cosmetic container according to the present invention.
Figure 8:
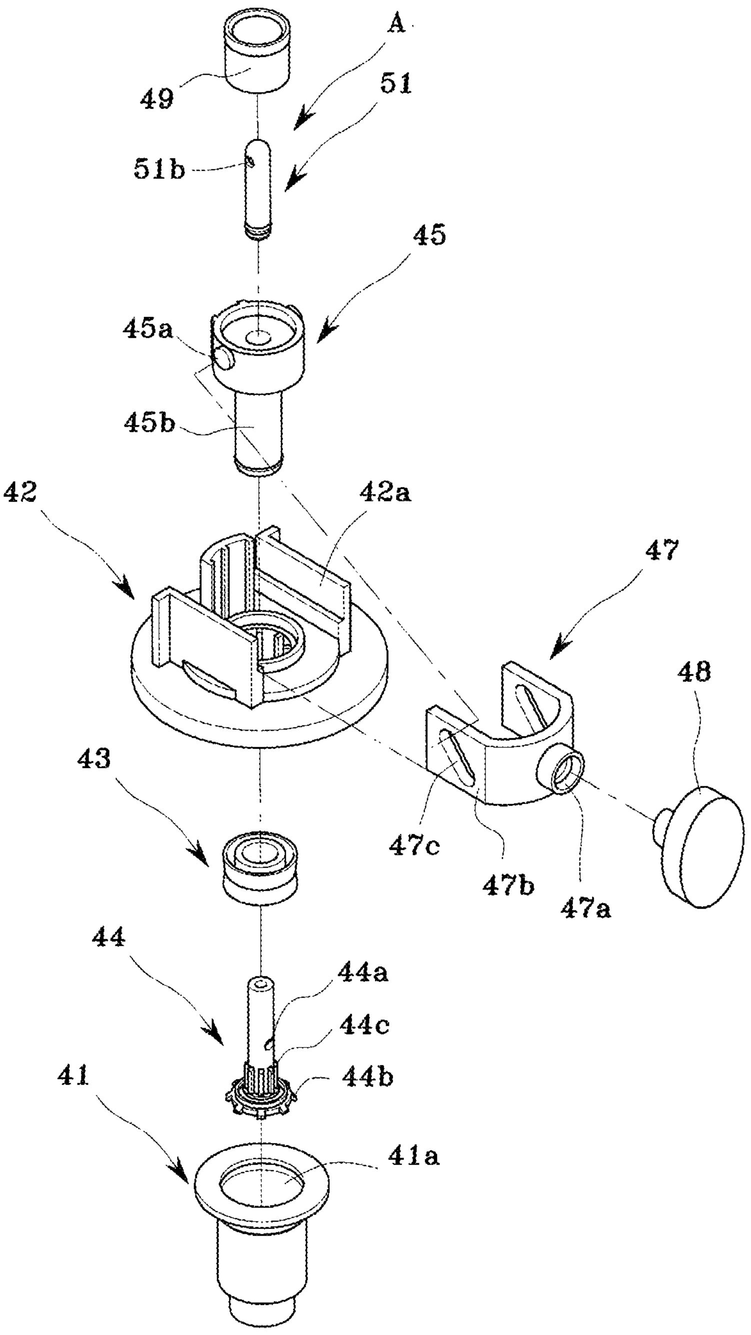
FIG. 8 is an exploded perspective view showing the configuration of the airless pump of the cosmetic container according to the present invention.
Figure 9:
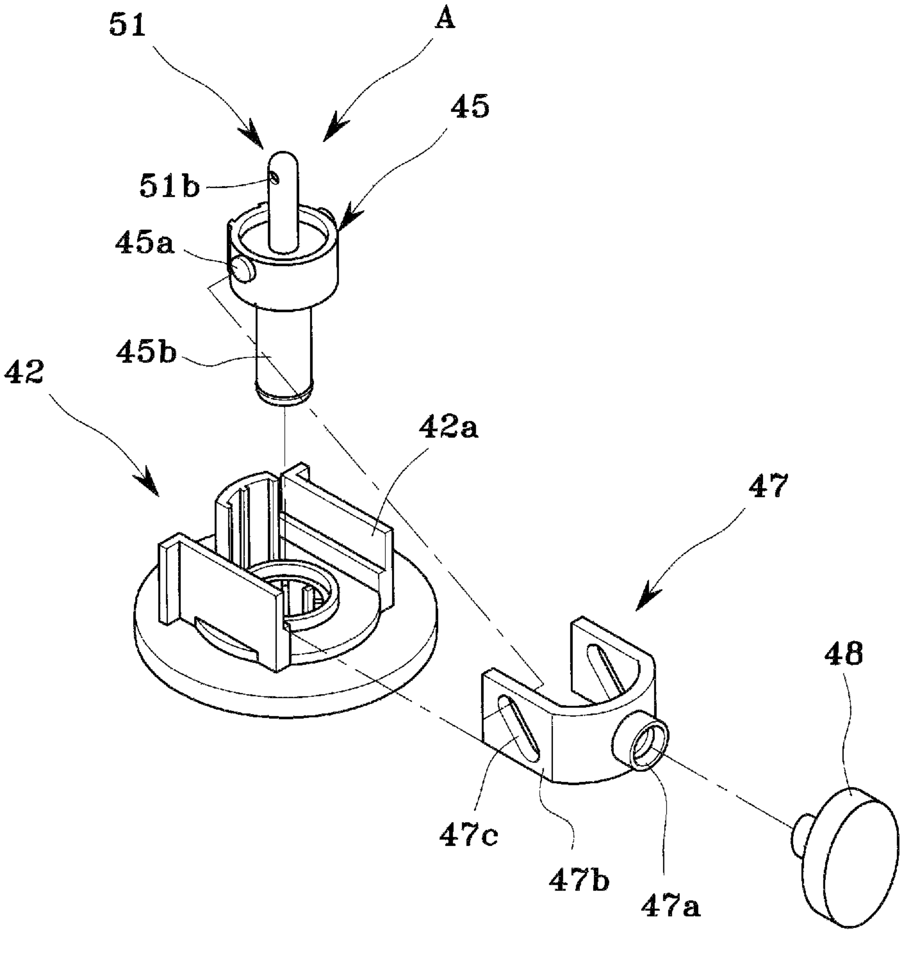
FIG. 9 is an exploded perspective view showing the nozzle opening/closing means of the cosmetic container according to the present invention shown in FIG. 8.
Figure 10:
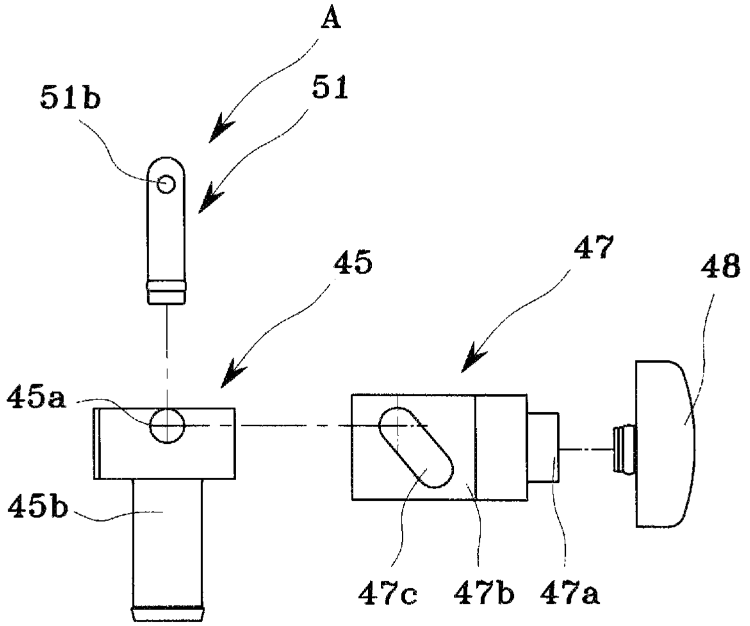
FIG. 10 is a configuration view showing the structure in which the slider is assembled to the operation pipe of the cosmetic container according to the present invention.
Figure 11:
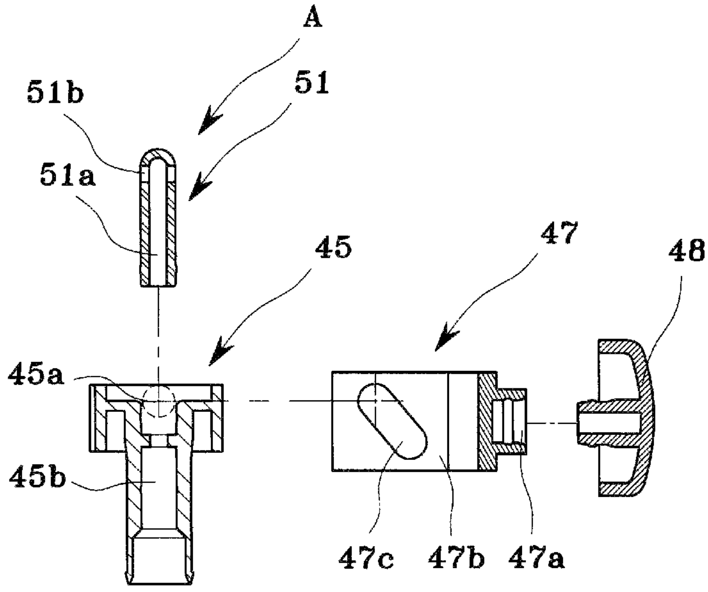
FIG. 11 is a cross-sectional view showing the structure according to the present invention shown in FIG. 10.

Reference will now be made in greater detail to exemplary embodiments of the invention, examples of which are illustrated in the accompanying drawings. Wherever possible, the same reference numerals will be used throughout the drawings and the description to refer to the same or like parts.

Figure 12:
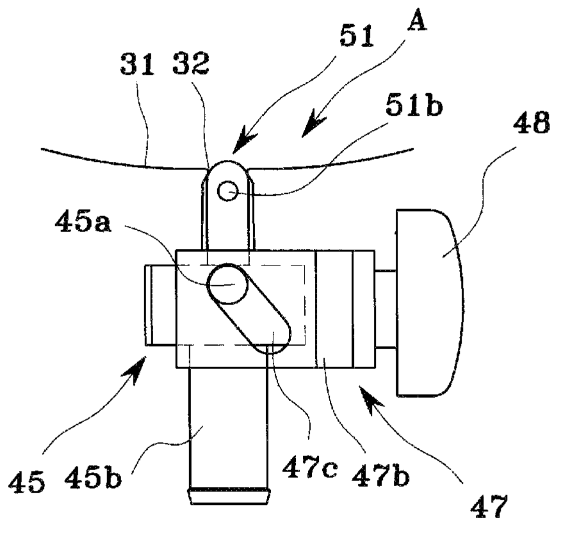
FIG. 12 is an assembled configuration view showing the nozzle opening/closing means of the cosmetic container according to the present invention.
Figure 13:
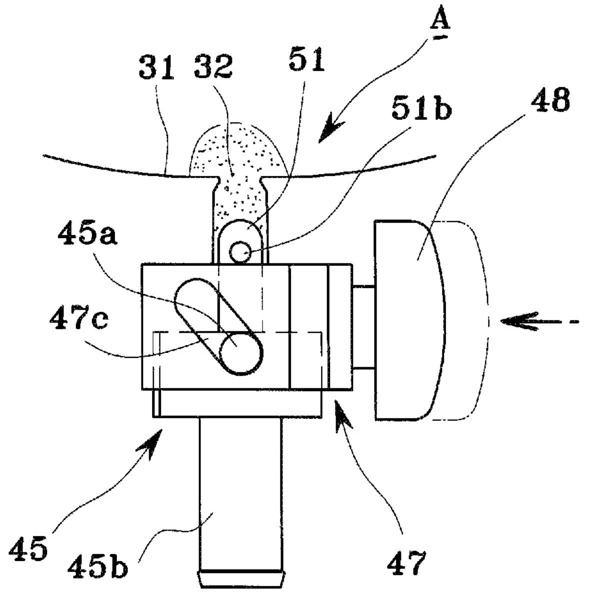
FIG. 13 is a view showing the operation state in which the operation button is pushed from the state shown in FIG. 12.
Figure 14:
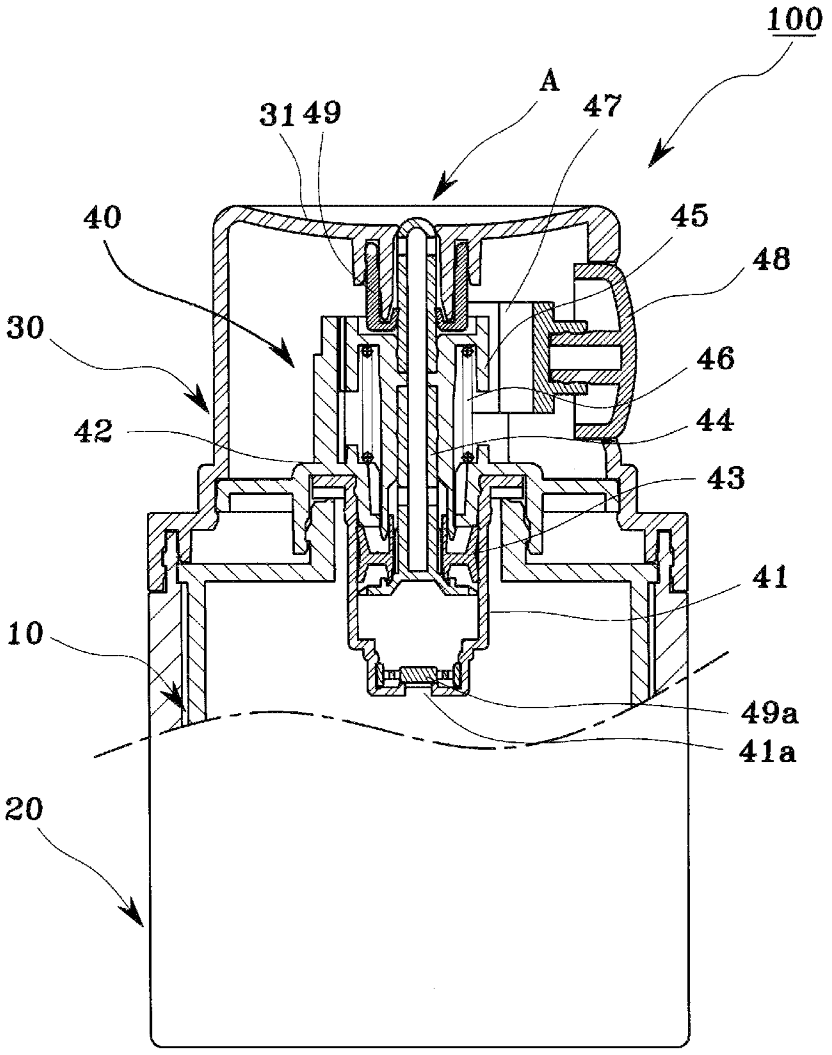
FIG. 14 to FIG. 16 are views showing the overall operation state of the cosmetic container according to the present invention.
Figure 15:
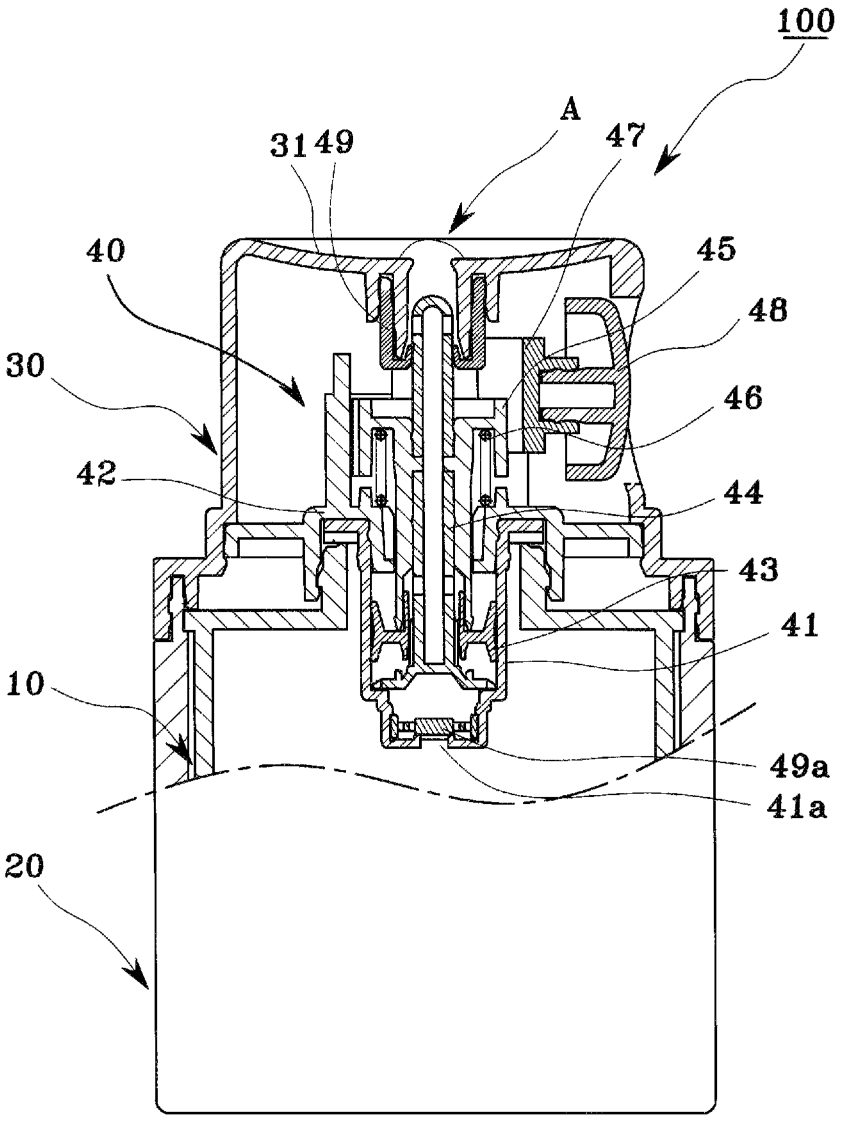
Figure 16:
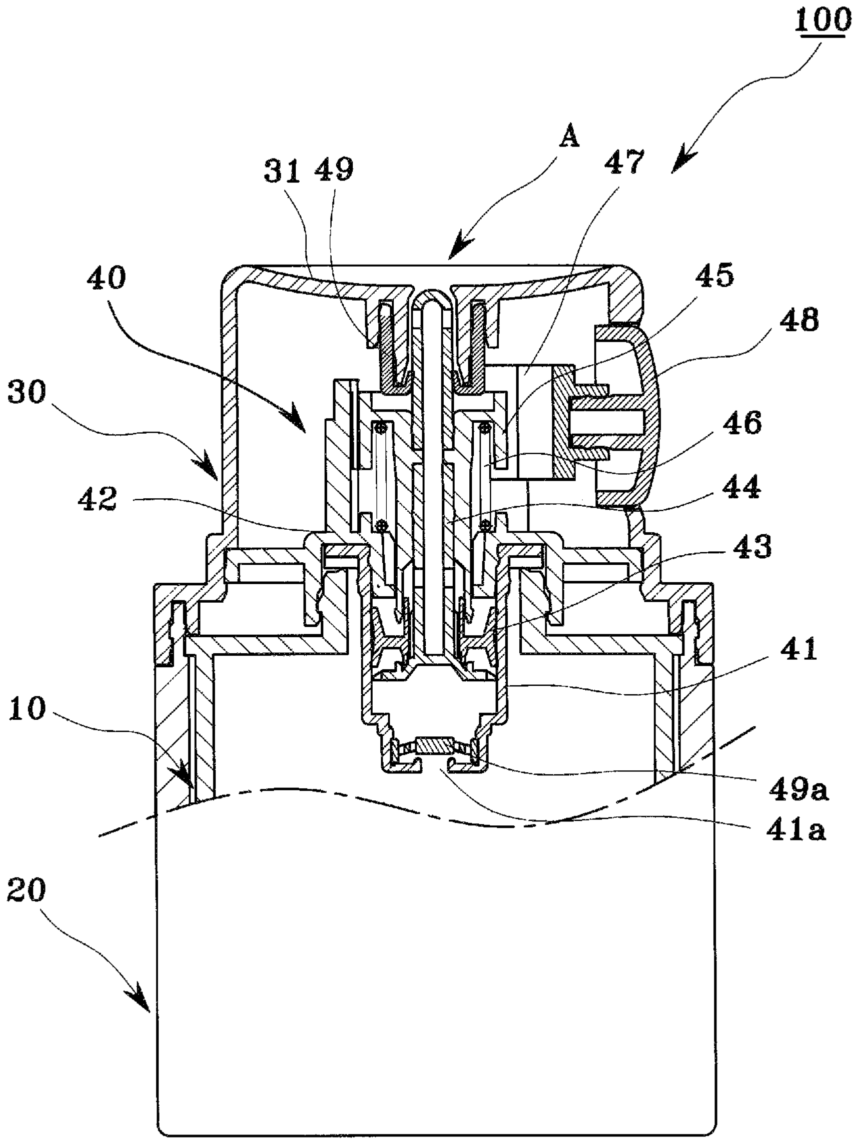

In the accompanying drawings, FIG. 1 to FIG. 6 show the overall structure of the present invention in detail, FIG. 7 to FIG. 11 show the specific components of the present invention in detail, and FIG. 12 and subsequent figures show the operation state of the present invention in detail.

As shown in the figures, the present invention is divided into a storage container 100, which contains content therein, and a cap 200, which opens and closes a nozzle part of the storage container 100 in order to protect the nozzle part from the outside.

The storage container 100 is configured as dual container bodies including inner and outer shells, and has a sealed structure so that not only liquid content but also gel or cream content can be safely and effectively stored therein for a long time.

In the storage container 100, the inner shell 10 contains the content therein, and the outer shell 20 surrounds the outside of the inner shell 10 to provide a dual body structure so that the container may maintain its overall external shape. A head 30 is disposed on the upper portion of the outer shell 20, and an airless pump 40 is disposed on the upper portion of the inner shell 10 inside the head 30.

The inner and outer shells 10 and 20 are made of different materials, such as hard synthetic resin or glass. For example, the inner shell 10 may be made of a material, such as laminate, aluminum, rubber, or synthetic resin, in order to more safely protect the content from direct light or Ultraviolet (UV) radiation. The outer shell 20 may be made of a material such as glass or synthetic resin, in accordance with a desired appearance.

The inner shell 10 has a storage space 11 containing therein the content, such as a cosmetic, and is configured such that upper and lower portions can be opened. An additional push plate 12 is disposed inside the inner shell 10, and can move upwards in response to the amount of the content to be dispensed, thereby functioning to push the content upwards. In addition, the airless pump 40 is disposed in the upper opening of the inner shell 10.

The push plate 12 is made of a flexible material, such as synthetic resin or rubber, and is fastened into the inner circumference of the inner shell 10, the lower portion of which can be opened. The push plate 12 is moved upwards by vacuum pressure generated in response to the dispensing of the content, thereby functioning to push the content upwards toward a nozzle.

The outer shell 20 provides the function of protecting the inner shell 10, and serves to maintain the overall external shape of the container. The outer shell 20 has the form of a cylinder or a polygonal body, such as a rectangular body, and is made of a rigid material in order to safely protect the content. It has an air hole 21 in the bottom thereof in order to allow the push plate 12 to operate.

The head 30 is disposed on the upper portion of the outer shell 20.

The head 30 has defined therein a space, in which the airless pump 40 is disposed, and a concave shape in the upper surface thereof, which forms a usage recess 31 that allows the user to easily use the content by scooping it with a finger. A nozzle 32 is disposed in the center of the usage recess 31. An installation hole 33 is formed in a portion of the wall of the head 30, and an operation button 48 of the airless pump 40 is disposed inside the installation hole 33.

The upper surface of the head 30 has defined therein the usage recess 31, which has a concave shape and is soft, whereas the nozzle 32 is disposed in the central portion of the head 30. Consequently, when the content is dispensed through the nozzle 32 through the operation of the pump, the user can conveniently use the content by scooping it with a finger along the usage recess 31.

Here, the nozzle 32 is called a nozzle although it is configured as a dispensing pipe that extends toward the interior, and finally provides an orifice through which the content can be dispensed.

In addition, the airless pump 40 is configured such that it can be closely fastened to the upper portion of the inner shell 10 within the inner space of the head 30 in order to maintain the inside of the inner shell 10 in a vacuum state.

As shown in the appended figures, the airless pump 40 is configured to seal the orifice, with a compression cylinder 41 thereof fastened into the orifice of the inner shell 10 via a sealing cap 42. A piston valve 43 and a piston 44 are fastened to the interior of the compression cylinder 41.

The compression cylinder 41 has the form of a cylinder, with an opening in the upper end thereof and a dispensing port 41*a* in the lower end thereof. The dispensing port 41*a* is opened and closed by a check valve. The compression cylinder 41 has also defined therein a compression chamber 41*b*, which compresses the content.

The body of the compression cylinder 41 stays in the state in which it is completely inserted into the inner shell 10 while a flange in the upper end of the compression cylinder 41 is in close contact with and fastened to the orifice of the inner shell 10, so that the content may be dispensed through the dispensing port 41*a*, which is opened and closed by a check valve 49*a*.

In addition, the sealing cap 42, which fixes the compression cylinder 41, is fixedly disposed between the inner shell 10 and the head 30 in order to provide the function of fixing related components that constitute the airless pump 40.

The sealing cap 42 has guide walls 42*a* in the upper portions thereof, the guide walls 42*a* being formed parallel to each other to guide a slider, which will be described later. The sealing cap 42 also has a center hole in the central portion thereof, such that the piston 44 and the operation pipe 45 are vertically fastened into the center hole so that upward and downward motion may be realized.

The piston valve 43 is made of a soft material, such as synthetic resin or rubber, and is fitted into and closely fastened to the inner circumference of the compression cylinder 41. The piston valve 43 serves to dispense the content from the compression chamber 41*b* by compressing it while moving up and down following the upward and downward motion of the piston 44 and the operation pipe 45.

The piston 44 has the form of a cylindrical pipe with an opening in the upper end thereof. A discharge hole 44*a* is formed in the portion of the piston 44 that is in the middle of the longitudinal direction, and communicates with the space inside the piston 44. The lower end of the piston 44 has the shape of a disc that is intended to move up and down along the inner circumference of the compression cylinder 41, and teeth-like blades 44*b* are formed on the outer circumference of the disc.

The upper portion of the piston 44 is interference-fitted into and fixedly fastened to the bottom of the operation pipe 45 to define a dispensing passage through which the content is intended to be dispensed. In this state, the piston 44 moves up and down following the upward and downward motion of the operation pipe 45.

Alternating ribs 44*c* protrude from the surface of the piston 44 in order to facilitate the flow of the content that is dispensed, and the piston valve 43 is mounted around the ribs 44*c* so that it may open and close the spaces between the ribs 44*c* following the upward and downward motion.

In addition, the operation pipe 45 is vertically fastened along the central hole from above the sealing cap 42, and is elastically supported by a spring 46. A nozzle-opening/closing means A, which serves to open and close the nozzle 32, is disposed above the operation pipe 45.

The operation pipe 45 has the form of a cylinder, and has a pair of hinge shafts 45*a*, which extends from opposite outer circumferential portions thereof, and a support 45*b*, which extends down from the lower portion thereof. The operation pipe 45 drives the piston valve 43 to move up and down following the upward and downward motion thereof.

In addition, the nozzle-opening/closing means A includes a pipe-like nozzle-opening/closing rod 51, which has a dispensing passage 51*a*, with the upper end thereof being hemispherical and the lower end thereof being open. A dispensing hole 51*b* is formed in the upper portion of the nozzle-opening/closing rod 51 such that it may communicate with the dispensing passage 51*a* inside the rod 51.

The lower end of the nozzle-opening/closing rod 51 is coupled to the upper portion of the operation pipe 45 such that the inner area of the rod 51 communicates with the pipe 45, thereby forming the passage for dispensing the content. The upper end of nozzle-opening/closing rod 51 has a hemispherical shape to provide the function of opening and closing the nozzle 32 of the head 30.

In addition, a separate packing 49 is fixedly fastened to the bottom of the head 30 in order to prevent the content from leaking to the outside when the content is dispensed through the nozzle 32. Specifically, the packing 49 has the form of a cylinder, and is fastened to the head 30 such that it surrounds the nozzle 32, thereby providing a hermetic seal between the packing 49 and the nozzle 32. It also provides a hermetic seal to the nozzle-opening/closing rod 51, which is fastened into the center hole.

In addition, the slider 47 for transmitting power from the operation button 48 is disposed outside the operation pipe 45 in the horizontal direction, i.e. the direction in which the operation button 48 is pushed. The operation button 48 is fastened to the distal end of the slider 47, and a portion of the operation button 48 is exposed to the outside.

The slider 47 has a fastening hole 47*a* in the central portion thereof. The operation button 48 is fastened into the fastening hole 47*a*. The slider 47 also has slide wings 47*b* in both sides thereof and shaft slots 47*c*. Each of the shaft slots 47*c* is formed in a respective slide wing 47*b* at an incline of 45°.

The slide wings 47*b* on both sides of the slider 47 are fastened between the guide walls 42*a* on the upper end of the sealing cap 42 such that they reciprocate along the guide walls 42*a*. At the same time, the shaft slots 47*c* are coupled to the hinge shafts 45*a* on both sides of the operation pipe 45, and the operation button 48 is fastened into the fastening hole 47*a*.

The operation button 48 is horizontally oriented through the installation hole 33 of the head 30 when a lug thereof is fastened into the fastening hole 74*a* of the slider 47. In this position, a portion of the operation button 48 is exposed to the outside so that the operation button 48 can be pushed from the outside.

The cosmetic container to which the present invention having the above-described configuration is applied includes the storage container 100 and the cap 200, and various types of cosmetics, including not only liquids but also gels and creams, can be effectively contained in the inner shell 10 of the storage container 100.

The storage container 100 has a dual structure in which the inner shell 10 ensures that the content, such as cosmetics, are safely contained, and the outer shell 20 protects the inner shell 10 while ensuring that the container maintains its overall external shape. In addition, the head 30 and the airless pump 40 are disposed on the upper portions of the inner and outer shells 10 and 20.

Consequently, the inner and outer shells 10 and 20 exhibit the function of safely and efficiently protecting the content from direct light and UV radiation from the outside for a long time thanks to their different materials or dual structure. In addition, the airless pump 40 stops both ambient air and external impurities from entering the container, thereby preventing the content from being polluted or deteriorated.

In particular, the present invention may more safely contain the content, since the nozzle 32 formed in the head 30 is tightly closed by the nozzle-opening/closing rod 51 of the nozzle-opening/closing means A so that the air or impurities from the outside are fundamentally blocked from entering.

When it is desired to use the content, i.e. cosmetics, inside the cosmetic container of the present invention in this state, the cap 200 is removed first, and then the operation button 48 disposed in the installation hole 33 of the head 30. In response to the pushing force, the slider 47 moves forwards in the horizontal direction.

The slider 47 is assembled between the guide walls 42*a* of the sealing cap 42, and performs a horizontal reciprocal motion by being guided by the guide walls 42*a*. The slider 47 thus moves forwards following the operation button 48 that is pushed.

In response to the forward motion of the slider 47, the operation pipe 45 having the hinge shafts 45*a*, which is coupled to the shaft slots 47*c* in the slide wings 47*b*, moves down in the direction perpendicular to that of the slider 47 while compressing the spring 46.

Specifically, the shaft slots 47*c* formed in the slide wings 47*b* of the slider 47 are formed at an incline of 45°, and the hinge shafts 45*a* of the operation pipe 45 are assembled to the shaft slots 47*c* in the direction crossing the longitudinal direction of the shaft slots 47*c*.

When the operation pipe 45 moves down as described above, the nozzle-opening/closing rod 51, which is coupled to the operation pipe 45 from above, moves down in the same stroke to open the nozzle 32 while concurrently actuating the airless pump 40.

Specifically, first, the downward motion of the operation pipe 45 moves down the piston 44, which is coupled to the bottom of the operation pipe 45. The piston 44, while moving down, compresses the compression chamber 41*b* in the compression cylinder 41 while being separated from the piston valve 43, thereby opening the dispensing passage through which the content is dispensed out.

As the operation pipe 45 moves down, the piston 44 moves down before the piston valve 43. Subsequently, the support 45*b* of the operation pipe 45 causes the piston valve 43 to sequentially move down, thereby compressing the compression chamber 41*b*.

Consequently, the sequential downward motion of the piston 44 and the piston valve 43 drives the content that has entered the compression chamber 41*b* toward the upper side of the piston valve 43 through the spaces between the lower blades 44*b* and between the ribs 44*c* of the piston 44.

Afterwards, the content is fed into the piston 44 through the discharge hole 44*a* in the piston 44, and is then dispensed along the dispensing passage 51*a* of the nozzle-opening/closing rod 51. The content that is dispensed along the dispensing passage 51*a* of the nozzle-opening/closing rod 51 is dispensed to the outside through the dispensing hole 41*b* in the upper end of the dispensing passage 51*a* and through the nozzle 32.

In the compression mode described above, the check valve 49*a* maintains the dispensing port 41*a* in the closed position.

Then, the user can use the content that is dispensed to the upper usage recess 31 of the head 30 through the nozzle 32 by scooping it out with a finger or using an additional make-up tool.

In reverse to the above-described operation, when the operation button 48 is released from the pressed position, the operation pipe 45 is moved up to the original position by the restoring force of the spring 46. Consequently, the nozzle-opening/closing rod 51 of the nozzle-opening/closing means is moved up in the same stroke, so that the upper end of the rod 51 closes the nozzle 32.

At the same time, the piston 44 connected to the bottom of the operation pipe 45 is also actuated to move up to its original position, thereby sequentially driving the piston valve 43 upwards. Consequently, the compression chamber 41*b* within the compression cylinder 41 expands and generates a strong pressure.

Specifically, the piston 44, while moving up, closes the dispensing passage defined between itself and the piston valve 43, so that the strong pressure caused by the upward motion of the piston 44 causes the check valve 49*a* to open the dispensing port 41*a*. As a result, the content in the inner shell 10 is introduced into the compression chamber 41*b*, where the content stands by for the next operation.

In the meantime, as the operation pipe 45 moves up, the slider 47 coupled to the hinge shafts 45*a*, which are disposed on the outer portions of the operation pipe 45, is actuated to move backwards along the inclined shaft slots 47*c*, and is then returned to its original position through the next operation.

Accordingly, by repeating the operation of pushing the operation button 48 as described above, the airless pump 40 disposed inside the head 30 is actuated to dispense a predetermined amount of the content from inside the inner shell 10.

When the container is not used, the nozzle 32 may stay in the closed state, thereby fundamentally blocking air as well as impurities from entering from the outside. When using the container, it is possible to actuate the pump and concurrently open the nozzle by simply pushing the operation button, so that the content can be dispensed through the nozzle, thereby facilitating the use of the cosmetic container.

Although the exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. An airless pump comprising:

a nozzle of a head, wherein content in a storage container is dispensed through the nozzle;

a compression cylinder disposed between the storage container and the nozzle, wherein the compression cylinder has a compression chamber communicating with the storage container;

a sealing cap fixing the compression cylinder;

a piston valve and a piston fastened into the compression chamber inside the compression cylinder;

an operation pipe disposed above the sealing cap in a direction perpendicular to a direction in which an operation button is pushed, wherein the operation pipe is actuated to move, thereby driving the piston and piston valve to move in the direction perpendicular to the direction in which the operation button is pushed;

a spring disposed between the operation pipe and the sealing cap; and a slider axially coupled to the operation pipe in a direction perpendicular to the operation pipe, wherein the slider is actuated by the operation button to horizontally reciprocate in one direction, thereby driving the operation pipe in the direction perpendicular to the direction in which the operation button is pushed.

2. The airless pump of claim 1, wherein the sealing cap is fastened into an opening of the storage container, wherein the sealing cap has guide walls in upper portions thereof, the guide walls being formed parallel to each other, the slider fastened to the guide walls such that the slider is movable back and forth, and wherein the piston and the operation pipe are fastened into the center hole of a central portion in the direction perpendicular to the direction in which the operation button is pushed, thereby realizing upward and downward motion.

3. The airless pump of claim 1, wherein the operation pipe is fastened into the sealing cap such that the operation pipe is actuated in the direction perpendicular to the direction in which the operation button is pushed, and has a hinge shaft on an outer circumference thereof and a support rod integrally formed in a lower portion thereof, the support rod actuating the piston valve, whereby the operation pipe is actuated to move in the direction perpendicular to the direction in which the operation button is pushed in response to reciprocal motion of the slider.

4. The airless pump of claim 1, wherein the slider has a fastening hole in a portion thereof, the operation button being fastened into the fastening hole, and slide wings in both sides thereof, the slide wings being guided along guide walls of the sealing cap, wherein a shaft hole is formed in each of the slide wings at an incline of 45° such that a hinge shaft of the operation pipe is coupled to the shaft hole, wherein the slider converts a force that has been applied by the operation button in the direction perpendicular to the direction in which the operation button is pushed, thereby actuating the operation pipe to move up and down.

5. A cosmetic container comprising:

an inner shell having an opening in an upper portion thereof and a push plate therein, wherein the push plate is fastened to an inner circumference thereof and pushes content to be dispensed;

an outer shell fastened to the inner shell from outside in order to protect the inner shell;

a head fastened to an upper portion of the outer shell, wherein the head has a usage recess with a concave upper surface, a nozzle formed in a central portion of the usage recess, and an operation button in an outer circumferential portion thereof, wherein the operation button is pushed in a horizontal direction;

an airless pump provided inside the head and connecting the inner shell and the nozzle such that the inner shell and the nozzle communicate with each other, wherein the airless pump converts power that has been produced when the operation button is pushed into a direction perpendicular to a direction in which the operation button is pushed in order to pump the content from the inner shell; and a nozzle-opening/closing means disposed between an upper portion of the airless pump and the nozzle in order to open/close the nozzle in a stroke that is same as an operation of the airless pump.

6. The cosmetic container of claim 5, wherein the usage recess in an upper surface of the head is concave and soft, wherein the content is dispensed through the nozzle, which is formed in the central portion of the usage recess.

7. The cosmetic container of claim 5, wherein the nozzle-opening/closing means includes a nozzle-opening/closing rod fixedly fastened to the operation pipe above the airless pump in the direction in which the operation button is pushed, wherein the nozzle-opening/closing rod comprises a pipe having a hemispherical upper end and an open lower end, the pipe of the nozzle-opening/closing rod defining a dispensing passage therein, wherein a dispensing hole communicating with the dispensing passage is formed in an upper portion of the nozzle-opening/closing rod, wherein the nozzle-opening/closing rod is actuated in the direction in which the operation button is pushed in the stroke that is same as the operation of the airless pump in order to open and close the nozzle.

* * * * *